(12) United States Patent
Marin

(10) Patent No.: US 6,698,481 B1
(45) Date of Patent: Mar. 2, 2004

(54) WHEEL WELL OBSTRUCTOR HAVING MEANS FOR ACCOMMODATING A PLURALITY OF DIFFERENT DEPTHS OF A WHEEL WELL OF A WHEEL RIM

(75) Inventor: Paulo Marin, Agoura Hills, CA (US)

(73) Assignee: RunflatAmerica Corporation, Burbank, CA (US)

( * ) Notice: Subject to any disclaimer, the term of this patent is extended or adjusted under 35 U.S.C. 154(b) by 36 days.

(21) Appl. No.: 10/115,687

(22) Filed: Apr. 3, 2002

(51) Int. Cl.$^7$ ............................................. B60C 29/00
(52) U.S. Cl. .................... 152/381.6; 152/381.5
(58) Field of Search ................ 152/381.5, 381.6, 152/400; 81/9.3, 486

(56) References Cited

U.S. PATENT DOCUMENTS

| | | | | |
|---|---|---|---|---|
| 632,028 A | * | 8/1899 | Smith ........................ | 152/400 |
| 987,230 A | * | 3/1911 | Hoover ...................... | 24/20 TT |
| 1,357,154 A | * | 10/1920 | Diem ......................... | 254/256 |
| 2,440,740 A | * | 5/1948 | Daddio ....................... | 152/400 |
| 4,083,086 A | * | 4/1978 | Oetiker ........................ | 81/9.3 |
| 4,122,882 A | * | 10/1978 | Fisher et al. ............... | 152/381.5 |
| 4,295,509 A | * | 10/1981 | Stein .......................... | 152/158 |
| 4,304,282 A | * | 12/1981 | Watts ......................... | 152/381.6 |
| 4,374,535 A | * | 2/1983 | Watts ......................... | 152/381.6 |
| 4,391,317 A | * | 7/1983 | Savage ........................ | 152/516 |
| 4,694,874 A | | 9/1987 | White | |
| 4,784,202 A | * | 11/1988 | White ......................... | 152/381.5 |
| 5,060,706 A | * | 10/1991 | Jones et al. ............... | 152/381.5 |
| 5,355,923 A | * | 10/1994 | Boni et al. ................ | 152/381.6 |
| 5,435,368 A | | 7/1995 | Lust | |

* cited by examiner

Primary Examiner—Russell D. Stormer
(74) Attorney, Agent, or Firm—Thomas I. Rozsa; Tony D. Chen

(57) ABSTRACT

The removable wheel well obstructor serves as a stable platform for supporting the beads of a flat tire, thereby resulting in a controlled run-flat tire capability. The obstructor is used for obstructing the interior of an annular wheel well of a wheel rim, wherein the wheel well has a predetermined radial depth. The obstructor includes a two-piece annular band of inextensible material of a predetermined axial width, a thickness which is substantially less than the depth of the wheel well and is adapted to circumferentially surround the wheel well, and is provided with an opening through its circumference. A plurality of snap-on frusto-cone shaped shims of a predetermined height are radially and inwardly attached to and spaced around the circumference of the band and are adapted to be received into the wheel well depth. A plurality of height adjusters are respectively attachable to the plurality of snap-on shims for further accommodating a plurality of different radial depths of wheel well.

62 Claims, 5 Drawing Sheets

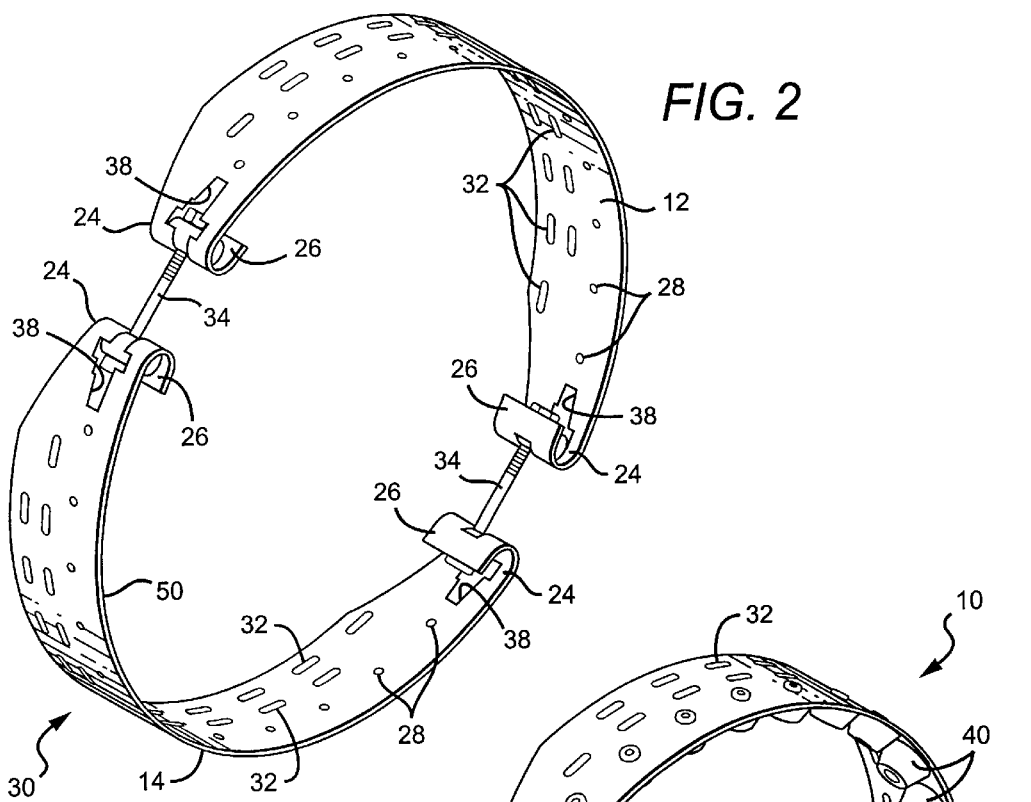
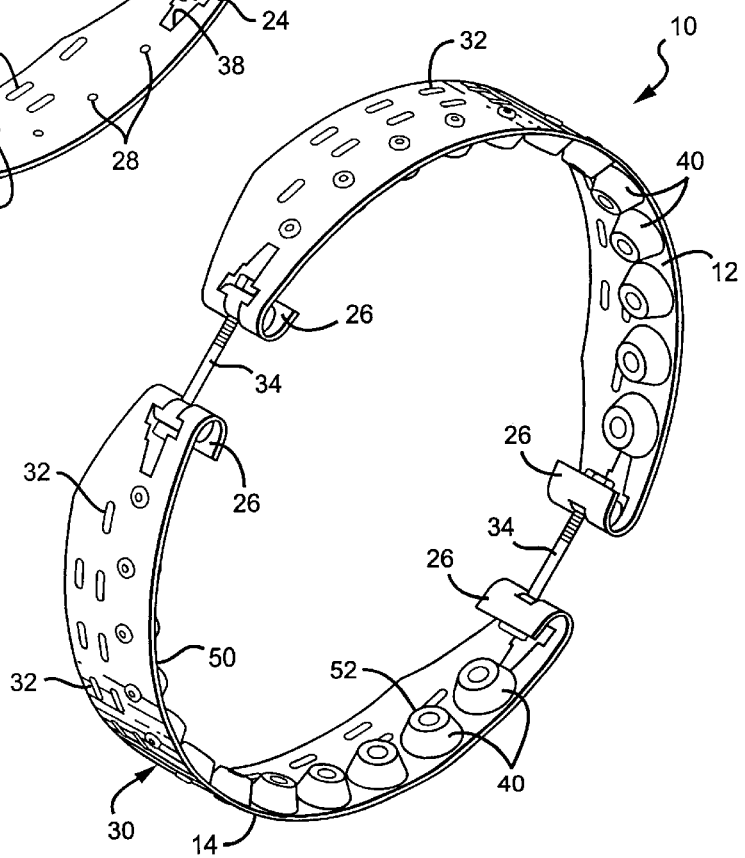

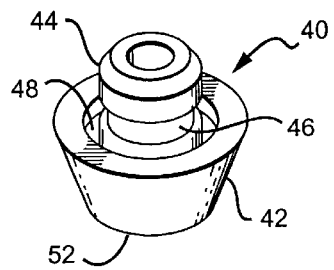
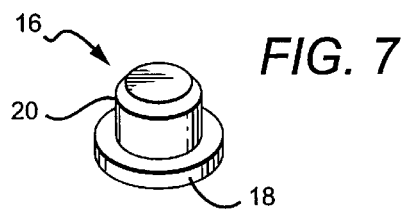
FIG. 6
FIG. 7
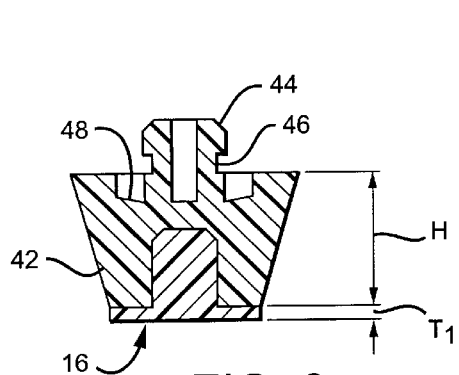
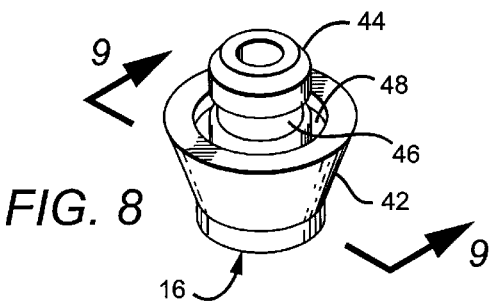
FIG. 9
FIG. 8
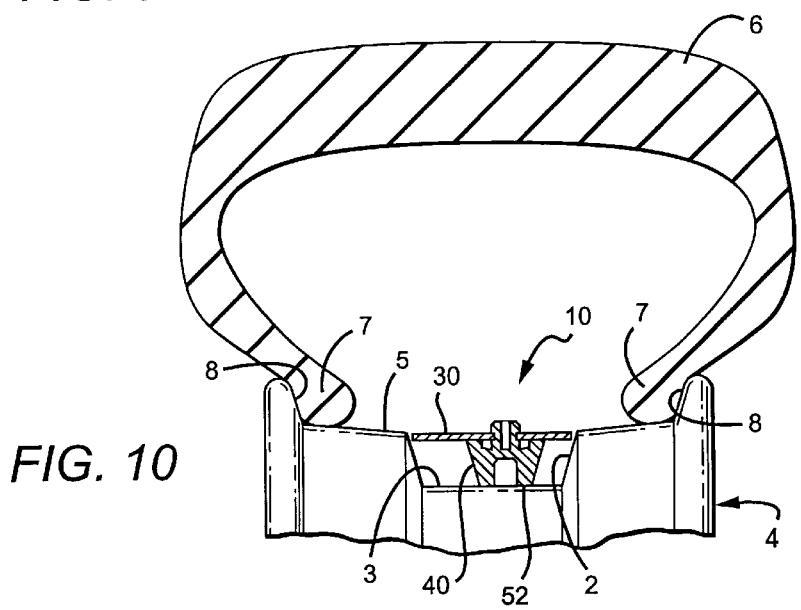
FIG. 10

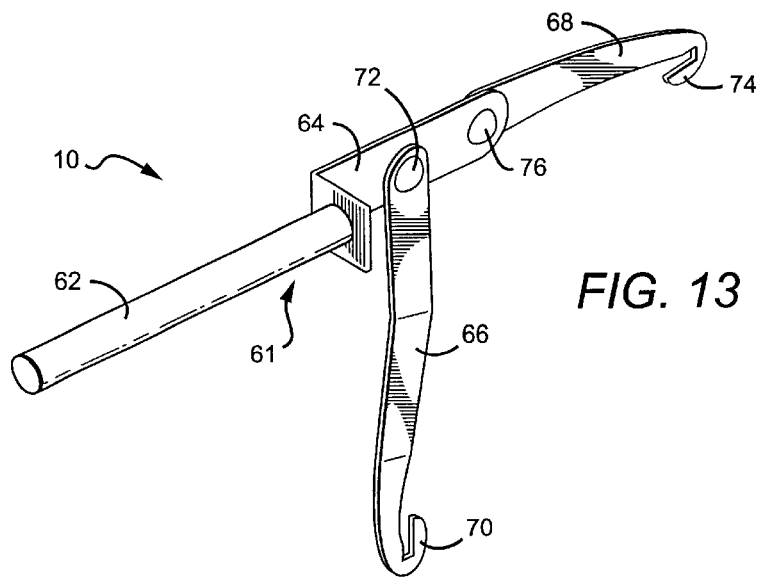
FIG. 13
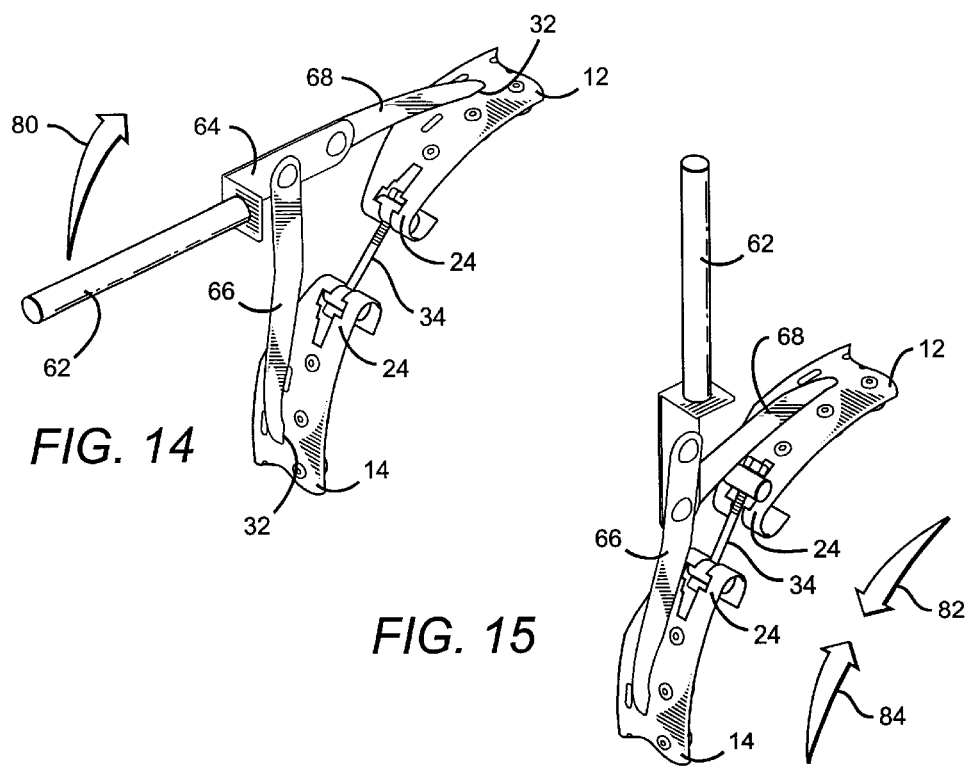
FIG. 14
FIG. 15

WHEEL WELL OBSTRUCTOR HAVING MEANS FOR ACCOMMODATING A PLURALITY OF DIFFERENT DEPTHS OF A WHEEL WELL OF A WHEEL RIM

BACKGROUND OF THE INVENTION

1. Field of the Invention

The present invention relates generally to the field of wheel rims for pneumatic tires of a vehicle. More particularly, the present invention relates to the field of wheel well obstructor bands for wheel rims of a vehicle.

2. Description of the Prior Art

Specifically, pneumatic tires are commonly mounted on a wheel rim. The wheel rim has an annular narrow wheel well which effectively reduces the diameter of the wheel well all around its circumference. Such a wheel well, sometimes called a drop-center type wheel rim, facilitates the mounting of a pneumatic tire on the wheel rim. When it is desired to install the tire onto the wheel rim, one side of the bead can be placed around the bead retaining flange and into the wheel well, thus enabling the diametrically opposing side of the bead to be placed over the bead retaining flange on the other side of the wheel rim. Removal of the tire is accomplished in the reverse manner.

After the tire is installed and the tire inflated with its bead seated against the flanges, the wheel well serves no purpose. The presence of the wheel well, however, has been found to pose safety problems. When pressure is unintentionally lost from the tire due to a blow out or puncture during operation, the wheel well becomes available to the bead of the tire. If the bead of the tire falls into the wheel well, it is possible for the diametrically opposite sides of the bead to unintentionally fall off the bead retaining flange, and thereby the entire bead can fall off the flange. When the bead of the tire is lost from the bead retaining flange, serious loss of control of a vehicle upon which the tire is mounted can result.

Prior art band-type well obstructors have been proposed for obstructing this wheel well so that, in the event of deflation of the tire during operation, the interior of the wheel well will not be available to the bead of the tire, thereby insuring that the tire will remain on the wheel rim. However, wheel well-fillers of current designs have to be made individually for different types of wheels of different diameter and especially for wheel wells of different effective depths. None of the known prior art wheel well obstructors is adjustable in depth.

The following two (2) prior art patents are found to be pertinent to the field of the present invention:

1. U.S. Pat. No. 4,694,874 issued to White on Sep. 22, 1987 for "Wheel Well Obstructor For A Wheel Rim" (hereafter the "White Patent"); and 2. U. S. Pat. No. 5,435,368 issued to Lüst on Jul. 25, 1995 for "Tire-Retention Device And Wheel Rim" ((hereafter the "Lüst Patent").

The White Patent discloses a wheel well obstructor for a wheel rim for obstructing the well of the hub of a wheel rim. The wheel obstructor has an inextensible band with integral circular protrusions mechanically extruded onto the band. The circular protrusions extend radially inwardly to abut against the base of the wheel well to retain the band in position surrounding the wheel well, and to resist crushing under the weight of the vehicle in the event of deflation of the tire.

The Lüst Patent discloses a well-filler of variable width for a drop-center wheel. The well filler has a band for circumposing the wheel rim in the well in engagement with a plurality of segments and mutually engageable connectors at first and second ends of the band. The connector means is adjustable for tightening of the band in the well around the rim. Engagement of the band with the segments is such that when the band is tightened in the well of a wheel rim, the segments are urged in directions transverse to the band so that the width of the well-filler matches that of the well.

It is desirable to provide an improved wheel well obstructor band with the capability of rapidly adapting to a plurality of different types of wheels of different diameter and especially for wheel wells of different effective depths. It is also desirable to provide a unique tightening hand tool for installing the improved wheel well obstructor band to a plurality of different types of wheels in a much more efficient way than prior art hand tools.

SUMMARY OF THE INVENTION

The present invention is an improved removable wheel well obstructor band which serves as a stable platform for supporting the beads of a flat tire, thereby resulting in a controlled run-flat tire capability.

The removable band-type wheel well obstructor is used for obstructing the interior of an annular wheel well of a wheel rim, wherein the wheel well has a predetermined radial depth. The obstructor includes a two-piece annular band of inextensible material of a predetermined axial width, a thickness which is substantially less than the depth of the wheel well and is adapted to circumferentially surround the wheel well, and is provided with an opening through its circumference. A plurality of radially and inwardly projecting adjustable snap-on frusto-cone shaped shims of a predetermined height are attached to and spaced around the circumference of the band and are adapted to be received into the wheel well. A plurality of height adjusters are respectively attachable to the plurality of snap-on shims for accommodating a plurality of different depths of wheel well. Means are also provided for tensionably retaining the wheel well obstructor band on the wheel rim.

It is an object of the present invention to provide an improved removable wheel well obstructor which includes a plurality of removable and attachable shims for adapting to the depth of a wheel well.

It is also an object of the present invention to provide an improved removable wheel well obstructor which includes a plurality of different thicknesses of a height adjuster that are attachable to the shims so that the plurality of shims can be adapted to a plurality of different depths of a wheel well.

It is an additional object of the present invention to provide an improved removable wheel well obstructor which includes a fastener assembly for drawing together spaced apart adjacent ends of the band portions.

It is a further object of the present invention to provide an improved removable wheel well obstructor wherein the plurality of shims provide positive resistance to movement of the wheel well obstructor into the wheel well of the wheel rim under the weight of the vehicle, and they also reduce the incidence of slippage or rotational movement of the obstructor with respect thereto.

It is still a further object of the present invention to provide a tightening hand tool to be used with the improved removable wheel well obstructor to draw the two ends of the band of the wheel well obstructor together so that tension is released, thereby allowing the installer to tighten the fastener to secure the wheel well obstructor to the wheel rim.

In the preferred embodiment of the present invention, the improved removable wheel well obstructor is a two-piece type band.

In an alternative embodiment of the present invention, the improved removable wheel well obstructor is a unitary type band.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 2 is a perspective view of a two-piece wheel well obstructor in accordance with the present invention shown in FIG. 1;

FIG. 3 is a perspective view of the two-piece wheel well obstructor with a plurality of frusto-cone shaped shims installed thereto;

FIG. 6 is a perspective of one of the plurality of frusto-cone shaped shims;

FIG. 7 is a perspective of one of the plurality of height adjusters;

FIG. 8 is a perspective of the height adjuster installed on the shim;

FIG. 9 is a cross-sectional taken along line 9—9 of FIG. 8;

FIG. 10 is a cross-sectional view of a portion of the wheel well obstructor and one of the plurality of frusto-cone shaped shims, assembled within the wheel well of the wheel rim, and the tire fitted with its beads seated against the flanges of the wheel rim;

FIG. 13 is a perspective view of a tightening hand tool used with the present invention removable wheel well obstructor;

FIG. 14 illustrates the tightening hand tool attached to the removable wheel well obstructor, showing the tightening tool in the uncompressed or untorqued condition or position; and FIG. 15 illustrates the tightening hand tool attached to the removable wheel well obstructor, showing the tightening tool in the compressed or torqued condition or position.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Described briefly, the present invention is a removable annular wheel well obstructor for obstructing a plurality of different inwardly disposed annular wheel wells of a plurality of wheel rims, wherein each wheel well of each wheel rim has a predetermined radial depth.

Figure 1:
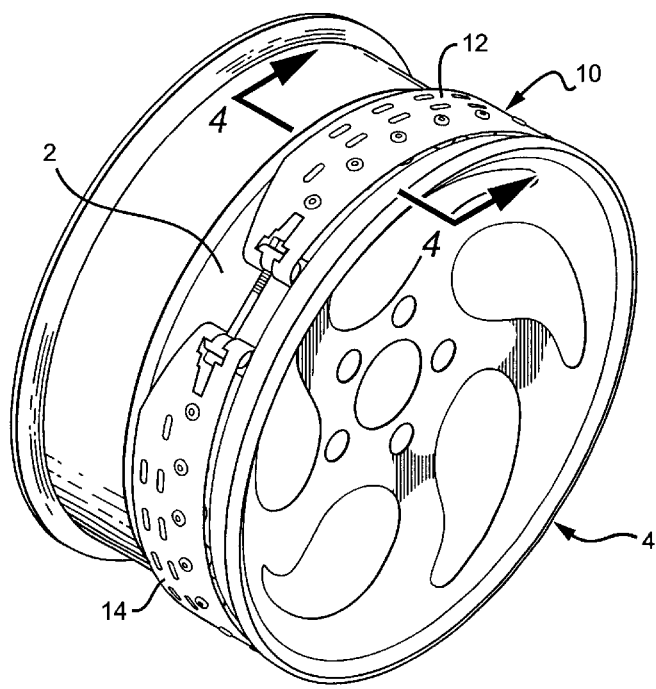
FIG. 1 is a perspective view of the present invention wheel well obstructor installed within a wheel well of a wheel rim.

Referring to FIG. 1, there is shown at 10 a preferred embodiment of the present invention removable wheel well obstructor installed on a wheel well 2 of a wheel rim 4. This wheel well obstructor 10 has at least two semicircular annular band portions 12 and 14 that are fabricated of a sturdy and relatively inextensible material, such as steel or other suitable material and coated with zinc plate.

Referring to FIGS. 1, 2, 3, 4 and 5, the band portions 12 and 14 are interconnected at its adjacent ends 24 to form an annular band member 30 of inextensible material of a predetermined axial width "W" and having an opening 50 through its circumference. The annular band member 30 has a thickness "T" that is substantially less than the predetermined radial depth "RD" of the wheel well 2 and being adapted to circumferentially surround the wheel well 2 of the wheel rim 4 and linear with the bottom surface 5 of the wheel rim 4 (see FIG. 4).

Referring to FIGS. 1, 2 and 3, each of the band portions 12 and 14 are substantially identical, and to the extent they are, only one will be described in detail. The band portion 12 includes a plurality of radial apertures 28 that extend therethrough and are equally spaced apart circumferentially around the band portion, and a pair of a plurality of slotted apertures 32 which are equally spaced apart around the circumference of the band portion and parallel to each other and the plurality of radial apertures 28. The band portion 12 includes flanges 26 at opposite ends 24 which are bent inwardly, and preferably are bent partially around in the form of a semi-circular loop. Each flange 26 is adapted to receive and hold one end of a typical fastener 34. These typical fasteners 34 are used with the present invention removable wheel well obstructor 10 for securing the adjacent ends 24 of the band portions 12 and 14 together as shown and since the parts of the fastener 34 are well known in the art, the description thereof will only be described in general terms. Because of these fasteners 34, assembly and disassembly of the annular band member 30 is thereby simplified. When tightened, the ends of the fastener 34 will bear snugly against the flanges 26 to tensionably draw together the adjacent ends 24 of the band portions 12 and 14 to hold the well the band member 30 in tension surrounding the wheel well 2 of the wheel rim 4.

Referring to FIGS. 2 and 3, the band portions 12 and 14 have holes 38 which are used so that the fastener 34 can be conveniently installed onto the flanges 26 from the outside circumference of the band member 30 after loosening the fastener. When the band portions 12 and 14 are urged apart by imparting tension to the band member 30, the ends of the fastener 34 will be securely held in position by the flanges 26 as long as this tension exists.

Referring to FIGS. 4, 5, 6, 8 and 9, there is shown at 40 one of the plurality of attachable and detachable shims or means used with the present invention removable wheel well obstructor 10. Each of the plurality of shims 40 is substantially identical, and to the extent they are, only one will be described in detail. The shim 40 has a predetermined height "H" and is rigid and lightweight and easy to form, thereby making the removable wheel well obstructor 10 less prone to being crushed under the weight of the vehicle tending to press the bead of the tire against the band member 30. The shim 40 has a generally receivable distal frusto-cone shaped body 42 and an attachable proximal stem 44 which is integrally formed at the bottom of the body 42. The frusto-cone shaped body 42 has a round shaped distal end surface 52 with a bore 54 for respectively receiving a plurality of height adjusters or means 16 as shown in FIGS. 8 and 9. The round shaped surface distal end 48 of the shim 40 significantly increases the coefficient of friction between the shims 40 and the base 3 of the wheel well 2 of the wheel rim 4 when the wheel well obstructor 10 is installed. This helps to prevent undesirable rotation of the wheel well obstructor 10 with respect to the wheel well 2 of the wheel rim 4. The shims 40 are attachable to the band portions 12 and 14, wherein the proximal stem 44 of each shim is respectively snapped onto the plurality of radial apertures of the band portions 12 and 14 of the annular band member 30. The proximal stem 44 of each shim 40 may have an annular groove 46 for securing it to the band portions 12 and 14 (see FIGS. 4 and 5). The frusto-cone shaped body 42 of the shim 40 may have an annular groove 48 located at the bottom for reducing material used and cost of the shims 40.

Referring to FIGS. 5, 7, 8 and 9, there is shown at 16 one of the plurality of attachable and detachable height adjusters or members used with the present invention removable wheel well obstructor 10. Each of the plurality of height adjusters 16 are substantially identical, and to the extent they are, only one will be described in detail. The height adjuster 16 has a generally round distal end 18 and an attachable proximal stem 20 which is integrally formed at the bottom of the distal end 18. The proximal stem 20 is press-fitted to the bore 54 of the shim 40 for further increasing the height "H" of the shim 40 so that the shim 40 can match the radial depth of a plurality of different radial heights "RD" of wheel well. The thickness $T_1$ or height of the distal end 18 of the height adjuster 16 can vary depending on the radial height of the wheel well 2 (see FIG. 9).

Referring now to FIG. 10, a portion of the wheel well obstructor 10 of the present invention is illustrated in cross-section installed surrounding the wheel well 2 of the wheel rim 4. The round shaped distal end surface 52 of the shim 40 abuts against the wheel base 3 of the wheel well 2. A pneumatic tire 6 is installed with its bead 7 seated against the bead retaining flanges 8 of the wheel rim 4 in the normal position.

Figure 4:
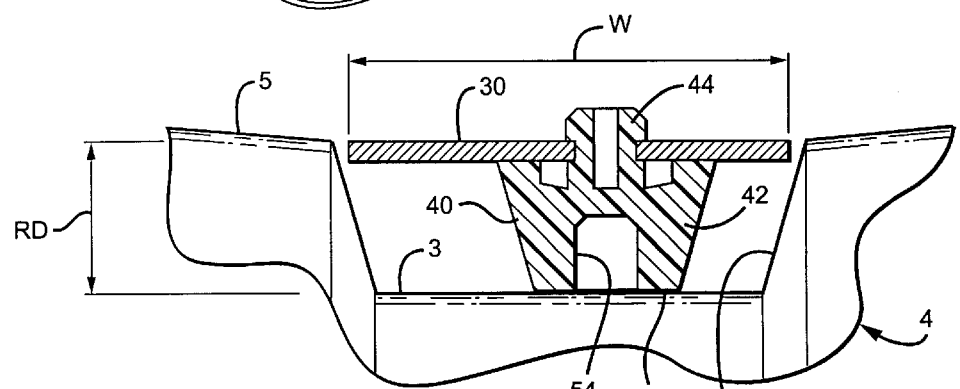
FIG. 4 is an enlarged partial cross-sectional view taken along line 4—4 of FIG. 1.
Figure 5:
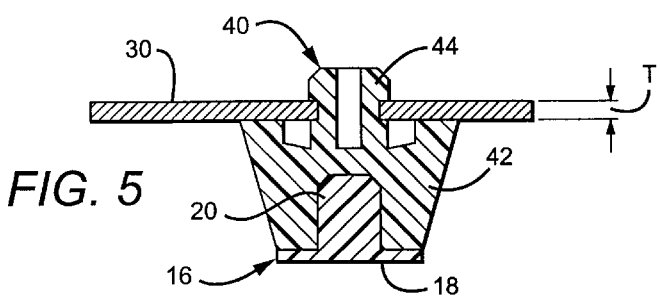
FIG. 5 is an enlarged cross-sectional view through one of the plurality of frusto-cone shaped shims and one of the plurality of height adjusters installed on the band of the wheel well obstructor.
Figure 11:
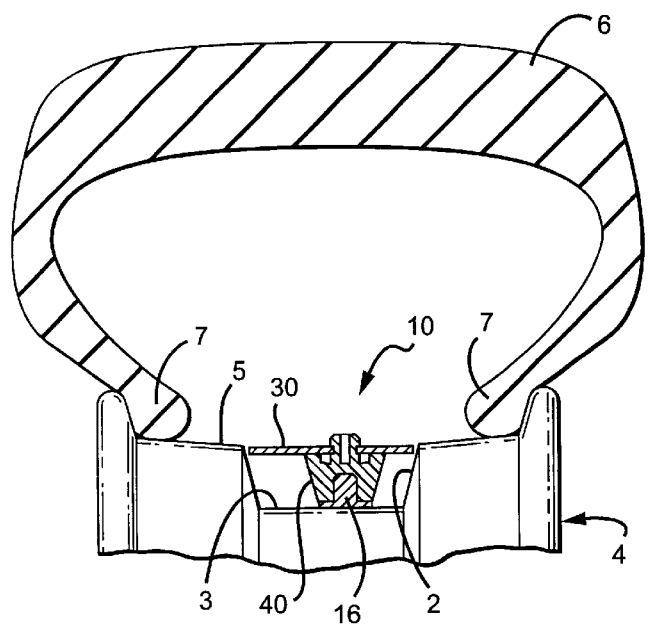
FIG. 11 is a cross-sectional view of a portion of the wheel well obstructor and one of the plurality of frusto-cone shaped shims and one of the plurality of height adjusters, assembled on a deep wheel well of the wheel rim, and the tire fitted with its beads seated against the flanges of the wheel rim.

In FIGS. 4 and 10, the shims 40 are approximately equal in height to the radial depth "RD" of the wheel well 2. It is not necessary, however, that the height "H" of the frusto-cone shaped body 42 of the shim 40 be equal to the radial depth "RD" of the wheel well 2. Due to the height adjusters 16, a plurality of different radial depths of wheel well 2 can be accommodated as shown in FIG. 11. The present invention can be installed in a deeper wheel well, as shown in FIG. 11, with the aid of the height adjusters 16, where the distal end 18 of the height adjuster 16 abuts against the wheel base 3 of the wheel well 2. A pneumatic tire 6 is installed with its bead 7 seated against the bead retaining flanges 8 of the wheel rim 4 in the normal position. Therefore, it can be seen that the present invention provides a band-type well obstructor which is sturdy, easy to form and to install, and which is adaptable to a wide variety of well depths.

Figure 12:
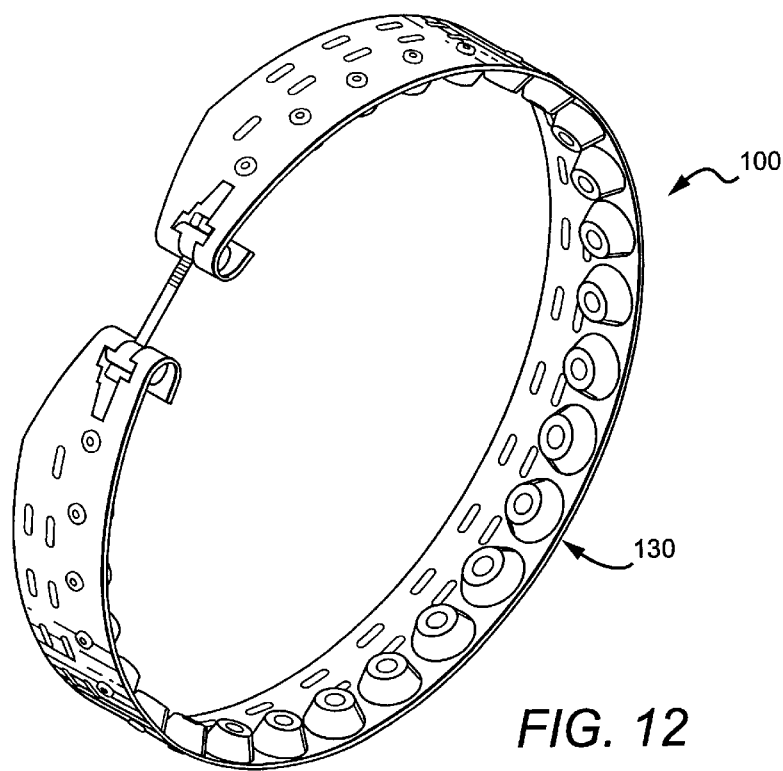
FIG. 12 is a perspective view of an alternative embodiment of a one-piece wheel well obstructor with a plurality of shims installed thereto.

Referring to FIG. 12, there is shown at 100 an alternative embodiment of the present invention removable wheel well obstructor 100. In this embodiment, the at least two semicircular annular band portions 12 and 14 shown in FIGS. 2 and 3 are substituted with a single band member 130 with its ends interconnected together by a fastener. Since it assembles and functions the same as previously described above, the description thereof will not be repeated. Height adjusters 16 are not shown attached to the shims 40 in this figure, but can be used in this alternative embodiment of the present invention removable wheel well obstructor 100.

The present invention conforms to conventional forms of manufacture or any other conventional way known to one skilled in the art, and is of simple construction and is easy to use. The shims 40 and height adjusters 16 can be made from several materials. The manufacturing process which could accommodate the construction of the shims and height adjusters may be injection, therefrom, etc. or other molding process. By way of example, the shims and height adjusters can be made of polyurethane material, nylon material, plastic material or any other suitable material.

FIG. 13 shows a tightening hand tool 60. FIG. 14 shows the tightening hand tool 60 in a released or relaxed condition. FIG. 15 shows the tightening hand tool 60 in a compressed or torqued condition. Referring to FIGS. 13, 14 and 15, there is shown at 60 a tightening hand tool to be used in conjunction with the present invention removable wheel well obstructor 10. The tightening hand tool 60 allows a user to draw the adjacent ends 24 of the pair of band portions 12 and 14 closer together to impart tension to the annular band member 30, thereby allowing the user to tighten the fasteners 34 to secure the wheel well obstructor to the wheel well of the wheel rim.

The hand tool 60 comprises a lever member 61 and a pair of movable linkage arms 66 and 68. The lever member 61 has a hand portion 62 and an attachment portion 64. The first linkage arm 66 has a hook end 70 or connecting end and an attachment end 72 which is pivotably connected to the attachment portion 64. The second linkage arm 68 also has a hook end 74 or connecting end and an attachment end 76 which is pivotable connected to the attachment portion 64 and located above the attachment end 72 of the first linkage arm 66.

In operation, the hook end 70 of the first linkage arm 66 is inserted into one of the plurality of slotted apertures 32 on the band portion 14 while the hook end of the second linkage arm 68 is inserted into one of the plurality of slotted apertures 32 of the band portion 12 (see FIG. 14). The hand portion 62 is pulled or pushed forward as indicated with arrow 80 shown in FIG. 14, thereby allowing the adjacent ends 24 of the band portions 12 and 14 to draw closer together as indicated with arrows 82 and 84 in FIG. 15, so that tension is released, where the installer or user can tighten the fastener 34.

The tightening hand tool 60 conforms to conventional forms of manufacture or any other conventional way known to one skilled in the art, and is of simple construction and is easy to use. By way of example, the hand tool is made of steel or any other rigid material.

Defined in detail, the present invention is a removable annular wheel well obstructor for obstructing a plurality of inwardly disposed annular wheel wells of a plurality of wheel rims, wherein each wheel well of each wheel rim has a predetermined radial depth, the wheel well obstructor comprising: (a) a pair of semicircular band portions being interconnected at its adjacent ends to form an annular band of inextensible material of a predetermined axial width and having an opening through its circumference and a plurality of equally spaced apart radial apertures extending therethrough, the annular band having a thickness substantially less than the predetermined radial depth of the wheel well and being adapted to circumferentially surround the wheel well; (b) a plurality of attachable and detachable frusto-cone shaped shims of a predetermined height, each frusto-cone shaped shim having an attachable proximal end and a receivable distal end, wherein each attachable proximal end is respectively snapped onto a respective one of the plurality of radial apertures of the annular band and projecting radially and inwardly of the annular band, where the plurality of frusto-cone shaped shims match the radial depth of the wheel well and being adapted to abut against the well base when the plurality of frusto-cone shaped shims are received into the wheel well; (c) a plurality of attachable and detachable height adjusters, each height adjuster having a predetermined height and attachable to the receivable distal end of the each frusto-cone shaped shim to further increase the height of the predetermined height of the each frusto-cone shaped shim for matching the radial depth of another wheel well of another wheel rim; and (d) means for tensionably retaining the wheel well obstructor on the wheel well of the wheel rim. Defined broadly, the present invention is a removable annular wheel well obstructor for obstructing a plurality of inwardly disposed annular wheel wells of a plurality of wheel rims, wherein each wheel well of each wheel rim has a predetermined radial depth, the wheel well obstructor comprising: (a) at least two band portions being interconnected at its adjacent ends to form an annular band of inextensible material of a predetermined axial width and having an opening through its circumference, the annular band having a thickness substantially less than the predetermined radial depth of the wheel well and being adapted to circumferentially surround the wheel well; (b) a plurality of attachable and detachable shims of a predetermined height, each shim having a proximal end and a distal end, wherein each proximal end is respectively attached onto and spaced apart around the circumference of the annular band and projecting radially and inwardly of the annular band, where the plurality of shims match the radial depth of the wheel well and being adapted to abut against the well base when the plurality of shims are received into the wheel well; (c) a plurality of attachable and detachable height adjusters, each height adjuster having a predetermined height and attachable to the distal end of the each shim to further increase the height of the predetermined height of the each shim for matching the radial depth of another wheel well of another wheel rim; and (d) means for tensionably retaining the wheel well obstructor on the wheel well of the wheel rim.

Defined more broadly, the present invention is a removable wheel well obstructor for obstructing a plurality of inwardly disposed annular wheel wells of a plurality of wheel rims, wherein each wheel well of each wheel rim has a predetermined radial depth, the wheel well obstructor comprising: (a) at least two band portions being interconnected at its adjacent ends to form a band of inextensible material of a predetermined axial width and having an opening through its circumference, the band having a thickness substantially less than the predetermined radial depth of the wheel well and being adapted to circumferentially surround the wheel well; (b) a plurality of fixed members of a predetermined height respectively attached to and around the circumference of the band and projecting radially and inwardly of the band, where the plurality of fixed members match the radial depth of the wheel well and being adapted to abut against the well base when the plurality of fixed members are received into the wheel well; (c) a plurality of adjustable members, each adjustable member having a predetermined height and attachable to the each fixed member to further increase the height of the predetermined height of the each fixed member for matching the radial depth of another wheel well of another wheel rim; and (d) means for tensionably retaining the wheel well obstructor on the wheel well of the wheel rim.

Defined even more broadly, the present invention is a removable wheel well obstructor for obstructing a plurality of inwardly disposed annular wheel wells of a plurality of wheel rims, wherein each wheel well of each wheel rim has a predetermined radial depth, the wheel well obstructor comprising: (a) at least two band portions being interconnected at its adjacent ends to form a band of inextensible material of a predetermined axial width and having an opening through its circumference, the band having a thickness substantially less than the predetermined radial depth of the wheel well and being adapted to circumferentially surround the wheel well; (b) a plurality of fixed members of a predetermined height respectively attached to and around the circumference of the band and projecting radially and inwardly of the band, where the plurality of fixed members match the radial depth of the wheel well and being adapted to abut against the well base when the plurality of fixed members are received into the wheel well; (c) means for further increasing the height of the predetermined height of the each fixed member for matching the radial depth of another wheel well of another wheel rim; and (d) means for tensionably retaining the band on the wheel well of the wheel rim.

Defined still even more broadly, the present invention is a removable wheel well obstructor for obstructing a plurality of inwardly disposed annular wheel wells of a plurality of wheel rims, wherein each wheel well of each wheel rim has a predetermined radial depth, the wheel well obstructor comprising: (a) at least two band portions being interconnected at its adjacent ends to form a band of inextensible material of a predetermined axial width and having an opening through its circumference, the band having a thickness substantially less than the predetermined radial depth of the wheel well and being adapted to circumferentially surround the wheel well; (b) a plurality of fixed members of a predetermined height respectively attached to and around the circumference of the band and projecting radially and inwardly of the band, where the plurality of fixed members match the radial depth of the wheel well and being adapted to abut against the well base when the plurality of fixed members are received into the wheel well; and (c) means for tensionably retaining the band on the wheel well of the wheel rim.

Further defined in detail, the present invention is a removable annular wheel well obstructor for obstructing a plurality of inwardly disposed annular wheel wells of a plurality of wheel rims, wherein each wheel well of each wheel rim has a predetermined radial depth, the wheel well obstructor comprising: (a) an annular band of inextensible material of a predetermined axial width and having an opening through its circumference and a plurality of equally spaced apart radial apertures extending therethrough, the annular band having a thickness substantially less than the predetermined radial depth of the wheel well and being adapted to circumferentially surround the wheel well; (b) a plurality of attachable and detachable frusto-cone shaped shims of a predetermined height, each frusto-cone shaped shim having an attachable proximal end and a receivable distal end, wherein each attachable proximal end is respectively snapped onto a respective one of the plurality of radial apertures of the annular band and projecting radially and inwardly of the annular band, where the plurality of frusto-cone shaped shims match the radial depth of the wheel well and being adapted to abut against the well base when the plurality of frusto-cone shaped shims are received into the wheel well; (c) a plurality of attachable and detachable height adjusters, each height adjuster having a predetermined height and attachable to the receivable distal end of the each frusto-cone shaped shim to further increase the height of the predetermined height of the each frusto-cone shaped shim for matching the radial depth of another wheel well of another wheel rim; and (d) means for tensionably retaining the wheel well obstructor on the wheel well of the wheel rim.

Further defined broadly, the present invention is a removable annular wheel well obstructor for obstructing a plurality of inwardly disposed annular wheel wells of a plurality of wheel rims, wherein each wheel well of each wheel rim has a predetermined radial depth, the wheel well obstructor comprising: (a) an annular band of inextensible material of a predetermined axial width and having an opening through its circumference, the annular band having a thickness substantially less than the predetermined radial depth of the wheel well and being adapted to circumferentially surround the wheel well; (b) a plurality of attachable and detachable shims of a predetermined height, each shim having a proximal end and a distal end, wherein each proximal end is respectively attached onto and spaced apart around the circumference of the annular band and projecting radially and inwardly of the annular band, where the plurality of shims match the radial depth of the wheel well and being adapted to abut against the well base when the plurality of shims are received into the wheel well; (c) a plurality of attachable and detachable height adjusters, each height adjuster having a predetermined height and attachable to the distal end of the each shim to further increase the height of the predetermined height of the each shim for matching the radial depth of another wheel well of another wheel rim; and (d) means for tensionably retaining the wheel well obstructor on the wheel well of the wheel rim.

Further defined more broadly, the present invention is a removable wheel well obstructor for obstructing a plurality of inwardly disposed annular wheel wells of a plurality of wheel rims, wherein each wheel well of each wheel rim has a predetermined radial depth, the wheel well obstructor comprising: (a) an annular band of inextensible material of a predetermined axial width and having an opening through its circumference, the band having a thickness substantially less than the predetermined radial depth of the wheel well and being adapted to circumferentially surround the wheel well; (b) a plurality of fixed members of a predetermined height respectively attached to and around the circumference of the band and projecting radially and inwardly of the band, where the plurality of fixed members match the radial depth of the wheel well and being adapted to abut against the well base when the plurality of fixed members are received into the wheel well; and (c) means for tensionably retaining the annular band on the wheel well of the wheel rim. Defined alternatively in detail, the present invention is a tightening hand tool used in conjunction with a wheel well obstructor having an annular band member with at least two adjacent ends for allowing a user to draw the two adjacent ends closer together to release impart. tension of the band member, thereby allowing the user to tighten a fastener to secure the band member to a wheel well of a wheel rim, the tightening hand tool comprising: (a) a lever member having a hand portion and an attachment portion; (b) a first movable linkage arm having a hook end and an attachment end pivotably connected to the attachment portion of the lever member; and (c) a second movable linkage arm having a hook end and an attachment end pivotably connected to the attachment portion of the lever member and located below the attachment end of the first movable linkage arm; (d) whereby the hook end of the first linkage arm being insertable into one slotted aperture at one of the two adjacent ends of the band member while the hook end of the second linkage arm being insertable into another slotted aperture at the other one of the two adjacent ends of the band member, and the hand portion being actuated thereby allowing the two adjacent ends of the band member to draw closer together, so that tension is released, and the fastener is tightened to secure the band member of the wheel well obstructor to the wheel well of the wheel rim.

Defined alternatively broadly, the present invention is a tightening hand tool used in conjunction with a wheel well obstructor having a band with at least two adjacent ends for allowing a user to draw the two adjacent ends closer together to release impart tension of the band, thereby allowing the user to tighten a fastener to secure the band to a wheel well of a wheel rim, the tightening hand tool comprising: (a) a lever member; (b) a first linkage arm having a connecting end and an attachment end pivotably connected to the lever member; and (c) a second linkage arm having a connecting end and an attachment end pivotably connected to the lever member and located adjacent to the attachment end of the first linkage arm; (d) whereby the connecting end of the first linkage arm being insertable into one aperture at one of the two adjacent ends of the band while the connecting end of the second linkage arm being insertable into another aperture at the other one of the two adjacent ends of the band, and the lever member being actuated thereby allowing the two adjacent ends of the band to draw closer together, so that tension is released, and the fastener is tightened to secure the band of the wheel well obstructor to the wheel well of the wheel rim.

Defined alternatively more broadly, the present invention is a tool used in conjunction with a wheel well obstructor having at least two adjacent ends for allowing a user to draw the two adjacent ends closer together to release impart tension of the wheel well obstructor, thereby allowing the user to tighten a fastener to secure the wheel well obstructor to a wheel well of a wheel rim, the tool comprising: (a) a lever member; and (b) a pair of linkage arms each having one end pivotably connected to the lever member and a connecting end; (c) whereby the connecting end of one of the pair of linkage arms being insertable into one aperture at one of the two adjacent ends of the wheel well obstructor while the connecting end of the other one of the pair of linkage arms being insertable into another aperture at the other one of the two adjacent ends of the wheel well obstructor, and the lever member being actuated thereby allowing the two adjacent ends of the wheel well obstructor to draw closer together, so that tension is released, and the fastener is tightened to secure the wheel well obstructor to the wheel well of the wheel rim.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A removable annular wheel well obstructor for obstructing a plurality of inwardly disposed annular wheel wells of a plurality of wheel rims, wherein each wheel well of each wheel rim has a predetermined radial depth, the wheel well obstructor comprising:
   a. a pair of semicircular band portions being interconnected at its adjacent ends to form an annular band of inextensible material of a predetermined axial width and having an opening through its circumference and a plurality of equally spaced apart radial apertures extending therethrough, the annular band having a thickness substantially less than the predetermined radial depth of said wheel well and being adapted to circumferentially surround said wheel well;
   b. a plurality of attachable and detachable frusto-cone shaped shims of a predetermined height, each frusto-cone shaped shim having an attachable proximal end and a receivable distal end, wherein each attachable proximal end is respectively snapped onto a respective one of said plurality of radial apertures of said annular band and projecting radially and inwardly of said annular band, where the plurality of frusto-cone shaped shims match the radial depth of said wheel well and being adapted to abut against the well base when the plurality of frusto-cone shaped shims are received into said wheel well;
   c. a plurality of attachable and detachable height adjusters, each height adjuster having a predetermined height and attachable to said receivable distal end of said each frusto-cone shaped shim to further increase the height of the predetermined height of said each frusto-cone shaped shim for matching the radial depth of another wheel well of another wheel rim; and
   d. means for tensionably retaining said wheel well obstructor on said wheel well of said wheel rim.

2. The wheel well obstructor in accordance with claim 1, further comprising means for allowing a tightening hand tool to be removably attachable to said adjacent ends of said pair of semicircular band portions to draw said adjacent ends to impart tension to said annular band, thereby allowing a user to tighten a fastener to secure said wheel well obstructor to said wheel rim.

3. The wheel well obstructor in accordance with claim 2, wherein said means includes a plurality of slotted apertures which are equally spaced apart around the circumference of said annular band and parallel to said plurality of radial apertures.

4. The wheel well obstructor in accordance with claim 1, wherein said each frusto-cone shaped shim is made out of polyurethane material.

5. The wheel well obstructor in accordance with claim 1, wherein said each height adjuster is made out of polyurethane material.

6. A removable annular wheel well obstructor for obstructing a plurality of inwardly disposed annular wheel wells of a plurality of wheel rims, wherein each wheel well of each wheel rim has a predetermined radial depth, the wheel well obstructor comprising:
   a. at least two band portions being interconnected at its adjacent ends to form an annular band of inextensible material of a predetermined axial width and having an opening through its circumference, the annular band having a thickness substantially less than the predetermined radial depth of said wheel well and being adapted to circumferentially surround said wheel well;
   b. a plurality of attachable and detachable shims of a predetermined height, each shim having a proximal end and a distal end, wherein each proximal end is respectively attached onto and spaced apart around the circumference of said annular band and projecting radially and inwardly of said annular band, where the plurality of shims match the radial depth of said wheel well and being adapted to abut against the well base when the plurality of shims are received into said wheel well;
   c. a plurality of attachable and detachable height adjusters, each height adjuster having a predetermined height and attachable to said distal end of said each shim to further increase the height of the predetermined height of said each shim for matching the radial depth of another wheel well of another wheel rim; and
   d. means for tensionably retaining said wheel well obstructor on said wheel well of said wheel rim.

7. The wheel well obstructor in accordance with claim 6, further comprising means for allowing a tightening hand tool to be removably attachable to said adjacent ends of said at least two band portions to draw said adjacent ends to impart tension to said annular band, thereby allowing a user to tighten a fastener to secure said wheel well obstructor to said wheel rim.

8. The wheel well obstructor in accordance with claim 7, wherein said means includes a plurality of slotted apertures which are equally spaced apart around the circumference of said annular band and located parallel to said plurality of shims.

9. The wheel well obstructor in accordance with claim 6, wherein said each shim is made out of polyurethane material.

10. The wheel well obstructor in accordance with claim 6, wherein said each height adjuster is made out of polyurethane material.

11. The wheel well obstructor in accordance with claim 6, wherein said plurality of shims are generally frusto-cone shape.

12. The wheel well obstructor in accordance with claim 6, wherein said annular band further comprises means for receiving said plurality of shims.

13. The wheel well obstructor in accordance with claim 12, wherein said receiving means includes a plurality of radial apertures which are equally spaced apart around the circumference of said annular band.

14. A removable wheel well obstructor for obstructing a plurality of inwardly disposed annular wheel wells of a plurality of wheel rims, wherein each wheel well of each wheel rim has a predetermined radial depth, the wheel well obstructor comprising:
   a. at least two band portions being interconnected at its adjacent ends to form a band of inextensible material of a predetermined axial width and having an opening through its circumference, the band having a thickness substantially less than the predetermined radial depth of said wheel well and being adapted to circumferentially surround said wheel well;

b. a plurality of fixed members of a predetermined height respectively attached to and around the circumference of said band and projecting radially and inwardly of said band, where the plurality of fixed members match the radial depth of said wheel well and being adapted to abut against the well base when the plurality of fixed members are received into said wheel well;

c. a plurality of adjustable members, each adjustable member having a predetermined height and attachable to said each fixed member to further increase the height of the predetermined height of said each fixed member for matching the radial depth of another wheel well of another wheel rim; and d. means for tensionably retaining said wheel well obstructor on said wheel well of said wheel rim.

15. The wheel well obstructor in accordance with claim 14, further comprising means for allowing a tightening hand tool to be removably attachable to said adjacent ends of said at least two band portions to draw said adjacent ends to impart tension to said band, thereby allowing a user to tighten a fastener to secure said wheel well obstructor to said wheel rim.

16. The wheel well obstructor in accordance with claim 15, wherein said means includes a plurality of slotted apertures which are equally spaced apart around the circumference of said band and located parallel to said plurality of fixed members.

17. The wheel well obstructor in accordance with claim 14, wherein said each fixed member is made out of plastic material.

18. The wheel well obstructor in accordance with claim 14, wherein said each adjustable member is made out of plastic material.

19. The wheel well obstructor in accordance with claim 14, wherein said plurality of fixed members are generally frusto-cone shape.

20. The wheel well obstructor in accordance with claim 14, wherein said band further comprises means for receiving said plurality of fixed members.

21. The wheel well obstructor in accordance with claim 20, wherein said receiving means includes a plurality of radial apertures which are equally spaced apart around the circumference of said band.

22. The wheel well obstructor in accordance with claim 21, wherein said each fixed member further comprises a proximal end and a distal end, wherein the proximal end of a fixed member is respectively snapped onto a respective one of said plurality of radial apertures and the distal end of each fixed member having a bore for respectively receiving a respective one of said plurality of adjustable members.

23. A removable wheel well obstructor for obstructing a plurality of inwardly disposed annular wheel wells of a plurality of wheel rims, wherein each wheel well of each wheel rim has a predetermined radial depth, the wheel well obstructor comprising:

a. at least two band portions being interconnected at its adjacent ends to form a band of inextensible material of a predetermined axial width and having an opening through its circumference, the band having a thickness substantially less than the predetermined radial depth of said wheel well and being adapted to circumferentially surround said wheel well;

b. a plurality of fixed members of a predetermined height respectively attached to and around the circumference of said band and projecting radially and inwardly of said band, where the plurality of fixed members match the radial depth of said wheel well and being adapted to abut against the well base when the plurality of fixed members are received into said wheel well;

c. means for further increasing the height of the predetermined height of said each fixed member for matching the radial depth of another wheel well of another wheel rim; and d. means for tensionably retaining said band on said wheel well of said wheel rim.

24. The wheel well obstructor in accordance with claim 23, further comprising means for allowing a tightening hand tool to be removably attachable to said adjacent ends of said at least two band portions to draw said adjacent ends to impart tension to said band, thereby allowing a user to tighten a fastener to secure said wheel well obstructor to said wheel rim.

25. The wheel well obstructor in accordance with claim 24, wherein said means includes a plurality of slotted apertures which are equally spaced apart around the circumference of said band and located parallel to said plurality of fixed members.

26. The wheel well obstructor in accordance with claim 23, wherein said each fixed member is made out of plastic material.

27. The wheel well obstructor in accordance with claim 23, wherein said plurality of fixed members are generally frusto-cone shape.

28. The wheel well obstructor in accordance with claim 23, wherein said band further comprises means for receiving said plurality of fixed members.

29. The wheel well obstructor in accordance with claim 28, wherein said receiving means includes a plurality of radial apertures which are equally spaced apart around the circumference of said band.

30. The wheel well obstructor in accordance with claim 29, wherein said each fixed member further comprises a proximal end and a distal end, wherein the proximal end is respectively snapped onto a respective one of said plurality of radial apertures and the distal end of each fixed member having a bore for respectively receiving said means for further increasing the height.

31. The wheel well obstructor in accordance with claim 23, wherein said means for further increasing the height includes a plurality of adjustable members, each adjustable member having a predetermined height and attachable to said each fixed member.

32. The wheel well obstructor in accordance with claim 31, wherein said each adjustable member is made out of plastic material.

33. A removable wheel well obstructor for obstructing a plurality of inwardly disposed annular wheel wells of a plurality of wheel rims, wherein each wheel well of each wheel rim has a predetermined radial depth, the wheel well obstructor comprising:

a. at least two band portions being interconnected at its adjacent ends to form a band of inextensible material of a predetermined axial width and having an opening through its circumference, the band having a thickness substantially less than the predetermined radial depth of said wheel well and being adapted to circumferentially surround said wheel well;

b. a plurality of fixed members of a predetermined height respectively attached to and around the circumference of said band and projecting radially and inwardly of said band, where the plurality of fixed members match the radial depth of said wheel well and being adapted to abut against the well base when the plurality of fixed members are received into said wheel well;

c. a plurality of adjustable members, each adjustable member having a predetermined height and respectively attachable to said each fixed member to further increase the height of the predetermined height of said each fixed member for matching the radial depth of another wheel well of another wheel rim; and d. means for tensionably retaining said band on said wheel well of said wheel rim.

34. The wheel well obstructor in accordance with claim 33, wherein said each adjustable member is made out of plastic material.

35. The wheel well obstructor in accordance with claim 33, further comprising means for allowing a tightening hand tool to be removably attachable to said adjacent ends of said at least two band portions to draw said adjacent ends to impart tension to said band, thereby allowing a user to tighten a fastener to secure said band to said wheel rim.

36. The wheel well obstructor in accordance with claim 35, wherein said means includes a plurality of slotted apertures which are equally spaced apart around the circumference of said band and located parallel to said plurality of fixed members.

37. The wheel well obstructor in accordance with claim 33, wherein said each fixed member is made out of plastic material.

38. The wheel well obstructor in accordance with claim 33, wherein said plurality of fixed members are generally frusto-cone shape.

39. The wheel well obstructor in accordance with claim 33, wherein said band further comprises means for receiving said plurality of fixed members.

40. The wheel well obstructor in accordance with claim 39, wherein said receiving means includes a plurality of radial apertures which are equally spaced apart around the circumference of said band.

41. The wheel well obstructor in accordance with claim 40, wherein said each fixed member further comprises a proximal end and a distal end, wherein the proximal end is respectively snapped onto a respective one of said plurality of radial apertures and the distal end having a bore for respectively receiving a respective one of said plurality of adjustable members.

42. A removable annular wheel well obstructor for obstructing a plurality of inwardly disposed annular wheel wells of a plurality of wheel rims, wherein each wheel well of each wheel rim has a predetermined radial depth, the wheel well obstructor comprising:

a. an annular band of inextensible material of a predetermined axial width and having an opening through its circumference and a plurality of equally spaced apart radial apertures extending therethrough, the annular band having a thickness substantially less than the predetermined radial depth of said wheel well and being adapted to circumferentially surround said wheel well;

b. a plurality of attachable and detachable frusto-cone shaped shims of a predetermined height, each frusto-cone shaped shim having an attachable proximal end and a receivable distal end, wherein each attachable proximal end is respectively snapped onto a respective one of said plurality of radial apertures of said annular band and projecting radially and inwardly of said annular band, where the plurality of frusto-cone shaped shims match the radial depth of said wheel well and being adapted to abut against the well base when the plurality of frusto-cone shaped shims are received into said wheel well;

c. a plurality of attachable and detachable height adjusters, each height adjuster having a predetermined height and attachable to said receivable distal end of said each frusto-cone shaped shim to further increase the height of the predetermined height of said each frusto-cone shaped shim for matching the radial depth of another wheel well of another wheel rim; and d. means for tensionably retaining said wheel well obstructor on said wheel well of said wheel rim.

43. The wheel well obstructor in accordance with claim 42, further comprising means for allowing a tightening hand tool to be removably attachable to said annular band to draw the ends to impart tension to said band, thereby allowing a user to tighten a fastener to secure said annular band to said wheel rim.

44. The wheel well obstructor in accordance with claim 43, wherein said means includes a plurality of slotted apertures which are equally spaced apart around the circumference of said band and located parallel to said plurality of fixed members.

45. The wheel well obstructor in accordance with claim 42, wherein said band further comprises means for receiving said plurality of frusto-cone shaped shims.

46. The wheel well obstructor in accordance with claim 45, wherein said receiving means includes a plurality of radial apertures which are equally spaced apart around the circumference of said band.

47. A removable annular wheel well obstructor for obstructing a plurality of inwardly disposed annular wheel wells of a plurality of wheel rims, wherein each wheel well of each wheel rim has a predetermined radial depth, the wheel well obstructor comprising:

a. an annular band of inextensible material of a predetermined axial width and having an opening through its circumference, the annular band having a thickness substantially less than the predetermined radial depth of said wheel well and being adapted to circumferentially surround said wheel well;

b. a plurality of attachable and detachable shims of a predetermined height, each shim having a proximal end and a distal end, wherein each proximal end is respectively attached onto and spaced apart around the circumference of said annular band and projecting radially and inwardly of said annular band, where the plurality of shims match the radial depth of said wheel well and being adapted to abut against the well base when the plurality of shims are received into said wheel well;

c. a plurality of attachable and detachable height adjusters, each height adjuster having a predetermined height and attachable to said distal end of said each shim to further increase the height of the predetermined height of said each shim for matching the radial depth of another wheel well of another wheel rim; and d. means for tensionably retaining said wheel well obstructor on said wheel well of said wheel rim.

48. The wheel well obstructor in accordance with claim 47, further comprising means for allowing a tightening hand tool to be removably attachable to said annular band to draw the ends to impart tension to said band, thereby allowing a user to tighten a fastener to secure said annular band to said wheel rim.

49. The wheel well obstructor in accordance with claim 48, wherein said means. includes a plurality of slotted apertures which are equally spaced apart around the circumference of said band and located parallel to said plurality of fixed members.

50. The wheel well obstructor in accordance with claim 47, wherein said band further comprises means for receiving said plurality of shims.

51. The wheel well obstructor in accordance with claim 50, wherein said receiving means includes a plurality of radial apertures which are equally spaced apart around the circumference of said band.

52. A removable wheel well obstructor for obstructing a plurality of inwardly disposed annular wheel wells of a plurality of wheel rims, wherein each wheel well of each wheel rim has a predetermined radial depth, the wheel well obstructor comprising:
   a. an annular band of inextensible material of a predetermined axial width and having an opening through its circumference, the band having a thickness substantially less than the predetermined radial depth of said wheel well and being adapted to circumferentially surround said wheel well;
   b. a plurality of fixed members of a predetermined height respectively attached to and around the circumference of said band and projecting radially and inwardly of said band, where the plurality of fixed members match the radial depth of said wheel well and being adapted to abut against the well base when the plurality of fixed members are received into said wheel well; and
   c. means for tensionably retaining said annular band on said wheel well of said wheel rim.

53. The wheel well obstructor in accordance with claim 52, further comprising means for allowing a tightening hand tool to be removably attachable to said annular band to draw the ends to impart tension to said band, thereby allowing a user to tighten a fastener to secure said annular band to said wheel rim.

54. The wheel well obstructor in accordance with claim 53, wherein said means includes a plurality of slotted apertures which are equally spaced apart around the circumference of said band and located parallel to said plurality of fixed members.

55. The wheel well obstructor in accordance with claim 52, wherein said band further comprises means for receiving said plurality of fixed members.

56. The wheel well obstructor in accordance with claim 55, wherein said receiving means includes a plurality of radial apertures which are equally spaced apart around the circumference of said band.

57. The wheel well obstructor in accordance with claim 56, wherein said each fixed member further comprises a proximal end and a distal end, wherein the proximal end is respectively snapped onto said plurality of radial apertures and the distal end having a bore for respectively receiving said plurality of adjustable members.

58. A tightening hand tool used in conjunction with a wheel well obstructor having an annular band member with at least two adjacent ends for allowing a user to draw the two adjacent ends closer together to release impart tension of the band member, thereby allowing the user to tighten a fastener to secure the band member to a wheel well of a wheel rim, the tightening hand tool comprising:
   a. a lever member having a hand portion and an attachment portion;
   b. a first movable linkage arm having a hook end and an attachment end pivotably connected to said attachment portion of said lever member; and
   c. a second movable linkage arm having a hook end and an attachment end pivotably connected to said attachment portion of said lever member and located below said attachment end of said first movable linkage arm;
   d. whereby said hook end of said first linkage arm being insertable into one slotted aperture at one of the two adjacent ends of said band member while said hook end of said second linkage arm being insertable into another slotted aperture at the other one of the two adjacent ends of said band member, and said hand portion being actuated thereby allowing said two adjacent ends of said band member to draw closer together, so that tension is released, and said fastener is tightened to secure said band member of said wheel well obstructor to said wheel well of said wheel rim.

59. A tightening hand tool used in conjunction with a wheel well obstructor having a band with at least two adjacent ends for allowing a user to draw the two adjacent ends closer together to release impart tension of the band, thereby allowing the user to tighten a fastener to secure the band to a wheel well of a wheel rim, the tightening hand tool comprising:
   a. a lever member;
   b. a first linkage arm having a connecting end and an attachment end pivotably connected to said lever member; and
   c. a second linkage arm having a connecting end and an attachment end pivotably connected to said lever member and located adjacent to said attachment end of said first linkage arm;
   d. whereby said connecting end of said first linkage arm being insertable into one aperture at one of the two adjacent ends of said band while said connecting end of said second linkage arm being insertable into another aperture at the other one of the two adjacent ends of said band, and said lever member being actuated thereby allowing said two adjacent ends of said band to draw closer together, so that tension is released, and said fastener is tightened to secure said band of said wheel well obstructor to said wheel well of said wheel rim.

60. The tightening hand tool in accordance with claim 59, wherein said connecting end of said each linkage arm is a hook end.

61. A tool used in conjunction with a wheel well obstructor having at least two adjacent ends for allowing a user to draw the two adjacent ends closer together to release impart tension of the wheel well obstructor, thereby allowing the user to tighten a fastener to secure the wheel well obstructor to a wheel well of a wheel rim, the tool comprising:
   a lever member; and
   b. a pair of linkage arms each having one end pivotably connected to said lever member and a connecting end;
   c. whereby said connecting end of one of said pair of linkage arms being insertable into one aperture at one of the two adjacent ends of said wheel well obstructor while said connecting end of the other one of said pair of linkage arms being insertable into another aperture at the other one of the two adjacent ends of said wheel well obstructor, and said lever member being actuated thereby allowing said two adjacent ends of said wheel well obstructor to draw closer together, so that tension is released, and said fastener is tightened to secure said wheel well obstructor to said wheel well of said wheel rim.

62. The tool in accordance with claim 61, wherein said connecting end of said each linkage arm is a hook end.

* * * * *